US006780481B1

(12) United States Patent
Lavallée et al.

(10) Patent No.: US 6,780,481 B1

(45) Date of Patent: Aug. 24, 2004

(54) MELT PROCESSABLE THERMOPLASTIC POLYMER COMPOSITION

(75) Inventors: Claude Lavallée, London (CA); Maria P. Dillon, St. Paul, MN (US); Thomas J. Blong, Woodbury, MN (US); Susan S. Woods, Shoreview, MN (US); Shannon S. Le Blanc, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/569,795

(22) Filed: May 12, 2000

Related U.S. Application Data

(60) Provisional application No. 60/133,974, filed on May 13, 1999.

(51) Int. Cl.[7] ............................ B65D 1/00; C08L 27/12

(52) U.S. Cl. ...................... 428/35.7; 525/131; 525/153; 525/166; 525/178; 525/179; 525/180; 525/185; 525/199

(58) Field of Search ......................... 428/35.7; 525/131, 525/153, 166, 178, 179, 180, 185, 199, 175

(56) References Cited

U.S. PATENT DOCUMENTS

| | | | | |
|---|---|---|---|---|
| 3,125,547 A | | 3/1964 | Blatz | 260/45.5 |
| 4,558,141 A | | 12/1985 | Squire | 549/455 |
| 4,855,013 A | | 8/1989 | Ohta et al. | 156/601 |
| 4,904,735 A | | 2/1990 | Chapman et al. | 525/199 |
| 5,013,792 A | | 5/1991 | Chapman et al. | 525/166 |
| 5,015,693 A | | 5/1991 | Duchesne et al. | 525/187 |
| 5,064,594 A | | 11/1991 | Priester et al. | 264/127 |
| 5,132,368 A | | 7/1992 | Chapman et al. | 525/165 |
| 5,284,184 A | | 2/1994 | Noone et al. | 138/121 |
| 5,397,829 A | | 3/1995 | Morgan et al. | 524/463 |
| 5,464,904 A | | 11/1995 | Chapman et al. | 525/200 |
| 5,587,429 A | | 12/1996 | Priester | 525/187 |
| 5,679,741 A | | 10/1997 | Breton et al. | 525/71 |
| 5,710,217 A | * | 1/1998 | Blong et al. | 525/199 |
| 6,242,548 B1 | * | 6/2001 | Duchesne et al. | 526/255 |
| 6,277,919 B1 | * | 8/2001 | Dillon et al. | 525/199 |

FOREIGN PATENT DOCUMENTS

| | | | |
|---|---|---|---|
| EP | 0 503 714 A1 | 9/1992 | |
| EP | 1 055 499 A1 | 11/2000 | B29B/17/00 |
| JP | 09 057750 A | 3/1997 | |
| WO | WO 98/30619 | 7/1998 | |
| WO | WO 99/45065 | 9/1999 | |
| WO | WO00/69962 | 11/2000 | C08I/23/12 |

OTHER PUBLICATIONS

Johnson and Blong, "Recycle Aspects of Fluorocarbon Elastomer Polymer Processing Additivea," Jan., 1990, 3M Industrial Chemical Products Division, St. Paul, MN.

R. F. Westover, *Melt Extrusion*, Encyclopedia of Polymer Science and Technology, vol. 8, pp 573–81 (John Wiley & Sons, 1968).

A. Rudin et al., *Fluorocarbon Elastomer Aids Polyolefin Extrusion*, Plastics Engineering, Mar. 1986, at 63–66.

Rauwendaal, C., "Polymer Extrusion", Hansen Publishers, p. 23–48, 1986.

* cited by examiner

*Primary Examiner*—Ana Woodward

(74) *Attorney, Agent, or Firm*—James V. Lilly; Dean M. Harts

(57) ABSTRACT

A melt processable polymer composition that comprises a thermoplastic non-aliphatic host polymer and a minor but effective amount of a fluoropolymer processing aid, and a method of improving the melt processability of the host polymer are provided.

22 Claims, No Drawings

MELT PROCESSABLE THERMOPLASTIC POLYMER COMPOSITION

CROSS REFERENCE TO RELATED APPLICATION

This application claims priority from U.S. Ser. No. 60/133,974 filed May 13, 1999.

FIELD OF THE INVENTION

This invention relates to a melt processable thermoplastic polymer composition that employs a non-aliphatic (e.g., a non-hydrocarbon, aromatic, or a non-hydrocarbon/aromatic polymer) non-fluorinated host polymer and a fluoropolymer.

BACKGROUND

For any melt processable thermoplastic polymer composition, there exists a critical shear rate above which the surface of the extrudate becomes rough and below which the extrudate will be smooth. See, for example, R. F. Westover, *Melt Extrusion,* Encyclopedia of Polymer Science and Technology, Vol. 8, pp 573–81 (John Wiley & Sons 1968). The desire for a smooth extrudate surface competes, and must be optimized with respect to, the economic advantages of extruding a polymer composition at the fastest possible speed (i.e. at high shear rates).

Some of the various types of extrudate roughness and distortion (also sometimes referred to as melt defects) observed in high and low density polyethylenes are described by A. Rudin, et al., *Fluorocarbon Elastomer Aids Polyolefin Extrusion,* Plastics Engineering, March 1986, at 63–66. The authors state that for a given set of processing conditions and die geometry, a critical shear stress exists above which polyolefins such as linear low-density polyethylene (LLDPE), high-density polyethylene (HDPE), and polypropylene suffer melt defects. At low shear rates, defects may take the form of "sharkskin", a loss of surface gloss, that in more serious manifestations appears as ridges running more or less transverse to the extrusion direction. At higher rates, the extrudate can undergo "continuous melt fracture" becoming grossly distorted. At rates lower than those at which continuous melt fracture is first observed, LLDPE and HDPE can also suffer from "cyclic melt fracture", in which the extrudate surface varies from smooth to rough. The authors state further that lowering the shear stress by adjusting the processing. conditions or changing the die configuration can avoid these defects to a limited extent, but not without creating an entirely new set of problems. For example, extrusion at a higher temperature can result in weaker bubble walls in tubular film extrusion, and a wider die gap can affect film orientation.

There are other problems often encountered during the extrusion of thermoplastic polymers. They include a build up of the polymer at the orifice of the die (known as die build up or die drool), excessive backpressure during extrusion runs, and excessive degradation or low melt strength of the polymer due to high extrusion temperatures. These problems slow the extrusion process either because the process must be stopped to clean the equipment or because the process must be run at a lower speed.

Certain fluorocarbon processing aids are known to partially improve the melt processability of extrudable thermoplastic hydrocarbon polymers and allow for faster, more efficient extrusion. U.S. Pat. No. 3,125,547 to Blatz, for example, first described the use of fluorocarbon polymer process aids with melt-extrudable hydrocarbon polymers wherein the fluorinated polymers are homopolymers and copolymers of fluorinated olefins having an atomic fluorine to carbon ratio of at least 1:2 and wherein the fluorocarbon polymers have melt flow characteristics similar to that of the hydrocarbon polymers.

U.S. Pat. No. 5,397,829 to Morgan et al. describes the use of copolymers of tetrafluoroethylene and hexafluoropropylene having high hexafluoropropylene content as processing aids in polyolefins.

U.S. Pat. No. 5,464,904 to Chapman et al. discloses the use of semicrystalline fluoroplastics such as copolymers of tetrafluoroethylene and hexafluoropropylene and terpolymers of tetrafluoroethylene, hexafluoropropylene, and vinylidene fluoride with a polyolefin. The only enhancement of melt-processability described in this patent is shown in Examples 19 and 25 where a concentration of 1000 ppm of the fluoropolymer in linear low density polyethylene is said to reduce the extrusion pressure of the extrudable composition. There is no showing of a reduction in melt defects.

U.S. Pat. No. 5,710,217 to Blong at al. discloses an extrudable thermoplastic hydrocarbon composition that comprises an admixture of a melt processable hydrocarbon polymer as the major component and an effective amount of a chemically-resistant fluoropolymer process aid. The fluoropolymer contains at least 50% by weight of fluorine and comprises one or more fluoromonomers that are essentially completely ethylenically unsaturated.

U.S. Pat. No. 5,587,429 to Priester discloses a three part processing aid system for polyolefins. The system comprises a fluoropolymer, a polar-side-group-containing adjuvant, and a poly(oxyalkylene) polymer.

U.S. Pat. Nos. 4,904,735 and 5,013,792 (Chapman, Jr. et al.) describe a fluorinated processing aid for use with a difficultly melt-processable polymer comprising (1) a fluorocarbon copolymer which at the melt-processing temperature of the difficultly melt-processable polymer is either in a melted form if crystalline, or is above its glass transition temperature if amorphous, and (2) at least one tetrafluoroethylene homopolymer or copolymer of tetrafluoroethylene and at least one monomer copolymerizable therewith wherein the mole ratio is at least 1:1, and which is solid at the melt-processable temperature of the difficultly melt-processable polymer.

U.S. Pat. Nos. 5,064,594 to Priester et al., and U.S. Pat. No. 5,132,368 to Chapman, Jr. et al. describe the use of certain fluoropolymer process aids containing functional polymer chain end groups including —COF, —$SO_2F$, —$SO_2Cl$, $SO_3M$, —$OSO_3M$, and —COOM, wherein M is hydrogen, a metal cation, or a quaternary ammonium cation for use with a difficultly melt-processable polymer. These patents each require that the fluoropolymer comprise a molten component and a solid component at the extrusion temperature.

U.S. Pat. Nos. 5,015,693 and 4,855,013 to Duchesne and Johnson disclose the use of a combination of a poly (oxyalkylene) polymer and a fluorocarbon polymer as a processing additive for thermoplastic hydrocarbon polymers. The poly(oxyalkylene) polymer and the fluorocarbon polymer are used at such relative concentrations and proportions as to reduce the occurrence of melt defects during extrusion. Generally the concentration of the fluoropolymer is present at a level of from 0.005 to 0.2 weight percent of the final extrudate and the poly(oxyalkylene) polymer is present at a level of from 0.01 to 0.8 weight percent of the final extrudate. Preferably, the weight of the fluorocarbon polymer in the extrudate and the weight of the poly (oxyalkylene) polymer in the extrudate are in a ratio of 1:1 to 1:10.

EP 0 503 714 Al discloses a polyamide composition comprising

A) 100 parts by weight of a polyamide and

B) 0.001 to 5 parts by weight of a processing agent selected from fluorinated polymers. These compositions are said to exhibit improved processability as determined by a reduction in the amount of increase in extrusion pressure over time. Polyvinylidene fluoride is the only fluoropolymer exemplified in the publication.

While these known additives may provide improved melt processability in olefin polymers, they have not proven to be particularly successful in non-aliphatic polymers. Accordingly, there still exists a need for an effective processing aid to be used with non-aliphatic polymers.

SUMMARY

It has been discovered that a certain class of fluoropolymers are surprisingly effective in improving the melt processability of non-aliphatic polymers. The improvement in melt processability can be seen in one or more ways. For example, it may be seen in a reduction of melt defects such as sharkskin in non-aliphatic polymers, or in the postponement of the occurrence of these defects to higher extrusion rates than can be typically achieved without the use of the fluoropolymer. Alternatively, it has been discovered that the fluoropolymers are also surprisingly effective in reducing the occurrence of die build up and/or reducing the amount of backpressure during extrusion of non-aliphatic polymers, and permitting the use of lower extrusion temperatures to achieve an equivalent throughput.

In one aspect, the present invention provides a novel melt processable polymer composition that comprises a major amount (i.e., at least (and preferably greater than) 50% by weight) of a melt processable thermoplastic non-aliphatic host polymer and a minor, but effective, amount of the fluoropolymer processing aid. The fluoropolymer comprises up to (and preferably less than) 50% by weight of the melt processable polymer composition. The fluoropolymer may be selected from the group consisting essentially of amorphous and partially crystalline fluoropolymers.

In a particularly preferred aspect, the present invention provides an extrudable composition that comprises a fluoropolymer processing aid that is resistant to reaction with basic, acidic, or amine-containing moieties in the host polymer or the extrudable composition. These novel compositions utilize a fluoropolymer processing aid that does not readily react with or degrade in, the presence of these moieties. These fluoropolymer processing aids contain 15% by weight or less of interpolymerized units derived from a monomer that produces an acidic hydrogen on the backbone of the resulting fluoropolymer after polymerization. Preferably, these fluoropolymer processing aids contain 10% by weight or less (more preferably 5% by weight or less) of interpolymerized units derived from a monomer that produces an acidic hydrogen on the backbone of the resulting fluoropolymer after polymerization. Most preferably the fluoropolymer processing aids are essentially free of interpolymerized units derived from a monomer that produces an acidic hydrogen on the backbone of the resulting fluoropolymer after polymerization.

In yet another aspect, the present invention provides a method for improving the melt processability of the host polymer. In this method the host polymer is mixed with an effective amount of the fluoropolymer. The resulting melt processable polymer composition is preferably mixed until there is a uniform distribution of the fluoropolymer in the host polymer. The polymer composition is then melt processed.

As used herein, an effective amount of the fluoropolymer is that which (a) reduces the occurrence of melt defects during extrusion of the host polymer below the level of melt defects occurring during the extrusion of a host polymer that does not employ the fluoropolymer, or (b) delays the onset of the occurrence of such defects to a higher extrusion rate (that is a higher shear rate), or (c) reduces the occurrence of die build up, therefore extending the time between cleanup steps, or (d) reduces backpressure, therefore providing faster throughput or allowing the use of lower extrusion temperatures.

DETAILED DESCRIPTION

The fluoropolymers useful in the invention include both amorphous and partially crystalline (also referred to herein as semi-crystalline) fluoropolymers. Amorphous fluoropolymers usually do not exhibit a melt point. Semi-crystalline fluoropolymers are melt processable per se and have a melt point.

The selection of an amorphous or semicrystalline fluoropolymer for use in the invention is influenced by a number of factors such as the host polymer being used and the processing conditions being employed. In any event, the fluoropolymers are incompatible with the host polymer yet possess a melt viscosity that permits an easy and efficient incorporation into the host polymer melt.

The fluoropolymers useful in the invention are those that are molten at the temperatures used to extrude (or otherwise melt process) the host polymer. They comprise interpolymerized units derived from at least one fluorinated, ethylenically unsaturated monomer, preferably two or more monomers, of the formula $$RCF{=}C(R)_2 \quad (II)$$

wherein R is selected from H, F, Cl, alkyl of from 1 to 8 carbon atoms, aryl of from 1 to 8 carbon atoms, cyclic alkyl of from 1 to 10 carbon atoms, or perfluoroalkyl of from 1 to 8 carbon atoms or a functional group that may contain 1 or more hetero atoms. The R group preferably contains from 1 to 3 carbon atoms. In this monomer each R group may be the same as each of the other R groups. Alternatively, each R group may be different from one or more of the other R groups.

The fluoropolymers may also comprise a copolymer derived from the interpolymerization of at least one formula I monomer with at least one nonfluorinated, copolymerizable comonomer having the formula $$(R^1)_2C{=}C(R^1)_2 \quad (II)$$

wherein each $R^1$ is independently selected from H, Cl, or an alkyl group of from 1 to 8 carbon atoms, a cyclic alkyl group of from 1 to 10 carbon atoms, or an aryl group of from 1 to 8 carbon atoms. $R^1$ preferably contains from 1 to 3 carbon atoms.

Representative examples of useful fluorinated formula I monomers include, but are not limited to, vinylidene fluoride, tetrafluoroethylene, hexafluoropropylene, chlorotrifluoroethylene, 2-chloropentafluoropropene, dichlorodifluoroethylene, 1,1-dichlorofluoroethylene, and mixtures thereof. Perfluoro-1,3-dioxoles may also be used. The perfluoro-1,3-dioxole monomers and their copolymers are described in U.S. Pat. No. 4,558,141 (Squires).

Representative examples of useful formula II monomers include ethylene, propylene, etc.

Especially useful fluoropolymers include those derived from the interpolymerization of two or more different formula I monomers and optionally one or more formula I monomers with one or more formula II monomers. Examples of such polymers are those derived from interpolymerized units derived from vinylidene fluoride (VDF) and hexafluoropropylene (HFP); and those derived from tetrafluoroethylene (TFE) and at least 5 weight % of at least one copolymerizable comonomer other than TFE. This latter class of fluoropolymers includes polymers of interpolymerized units derived from TFE and HFP; polymers of interpolymerized units derived from TFE, HFP, and VDF; polymers of interpolymerized units derived from TFE, HFP and a formula II monomer; and polymers derived from interpolymerized units derived from TFE and a formula II monomer.

A preferred subclass of fluoropolymers useful in the invention are the semicrystalline fluoropolymers, also referred to herein as fluoroplastics. These polymers generally have a peak melting temperature of from 60° to 300° C. The fluoroplastics may be homopolymers or copolymers of a monomer of formula I or copolymers of at least one monomer of formula I with at least one monomer of formula II. Examples of preferred subclasses of fluorothermoplastic polymers useful in the invention include the following:

A. Fluorothermoplastics derived solely from VDF and HFP. Preferably, these fluorothermoplastics have interpolymerized units derived from 99 to 67 weight percent of VDF and from 1 to 33 weight percent HFP, more preferably from 90 to 67 weight percent VDF and from 10 to 33 weight percent HFP.

B. Fluorothermoplastics having interpolymerized units derived solely from (i) TFE, (ii) more than 25 weight percent of one, preferably two, ethylenically unsaturated copolymerizable fluorinated monomers other than TFE having the general structure of formula I. A preferred class of these fluoroplastics is derived from copolymerizing 30 to 70 weight % TFE, 10 to 30 weight %, HFP, and 5 to 50 weight %, preferably 10 to 45 weight % of a third comonomer other than TFE and HFP having the general structure of formula I. A subclass of this preferred class of fluoropolymer is derived from copolymerization of a monomer charge of TFE (preferably in an amount of 45 to 65 weight %), HFP (preferably in an amount of 10 to 30 weight %), and VDF (preferably in an amount of 15 to 35 weight %). A subspecies of these fluoroplastics useful as the fluoropolymer comprises the multimodal fluoroplastics described in application Ser. No. 09/311,111, filed of even date herewith, now U.S. Pat. No. 6,242,548, incorporated herein by reference.

C. Fluorothermoplastics derived from copolymerization of a monomer charge of TFE (preferably from 45 to 70 weight %), HFP (preferably from 10 to 20 weight %) and a formula II monomer, preferably an alpha olefin hydrocarbon ethylenically unsaturated comonomer having from 1 to 3 carbon atoms, such as ethylene or propylene (preferably from 10 to 20 weight %).

D. Fluorothermoplastics derived from TFE and a monomer having the general structure of formula II. Particularly preferred polymers of this subclass are copolymers of TFE and propylene. Such copolymers are preferably derived by copolymerizing from 80 to 95 weight %, more preferably from 85 to 90 weight %, of TFE with from 20 to 5 weight %, more from preferably from 15 to 10 weight %, of the Formula II comonomer.

Another preferred subclass of fluoropolymers useful in the invention are the amorphous fluoropolymers. Examples of preferred amorphous fluoropolymers include the following:

A. Amorphous polymers derived from TFE and propylene. These polymers typically have interpolymerized units derived from 50–80 weight percent TFE and from 50 to 20 weight percent propylene.

B. Amorphous polymers derived from TFE, VDF, and propylene. These polymers typically have interpolymerized units derived from 45 to 80 weight percent TFE, from 5 to 40 weight percent VDF and from 10 to 25 weight percent propylene.

C. Amorphous polymers derived from VDF and HFP. These polymers typically have interpolymerized units derived from 30 to 90 weight percent VDF and from 70 to 10 weight percent HFP.

As discussed previously, when either the host polymer or the extrudable composition contains reactive functionality (e.g., a basic, acidic or an amine-containing functionality), the fluoropolymer preferably contains 15% by weight or less of interpolymerized units derived from a monomer that produces an acidic hydrogen on the backbone of the resulting fluoropolymer after polymerization. This preserves the stability of the fluoropolymer in the extrudable composition. Thus, it is preferable that the use of such monomers that yield an acidic hydrogen be minimized. Accordingly, the fluoropolymer preferably contains less than 10% by weight of such units, more preferably less than 5% by weight of such units, and most preferably is essentially free of such units. Generally, monomers in which one vinyl carbon atom is perfluorinated (i.e. is saturated with fluorine atoms) and in which the other vinyl carbon atom contains at least one hydrogen atom will yield acidic hydrogen atoms on the backbone of a fluoropolymer into which they are polymerized, leaving the fluoropolymer susceptible to chemical attack by a base. This monomer class includes vinylidene fluoride, trifluoroethylene, 1-hydropentafluoropropene, and 2-hydropentafluoropropene.

Examples of useful commercially available amorphous and semicrystalline fluoropolymers include DYNAMAR™ FX 9613, DYNEON™ THV 200 and DYNEON™ THV 400 all available from Dyneon LLC, Oakdale, Minn. Other useful commercially available materials include the KYNAR™ fluoropolymers available from Solvay and the AFLAS™ fluoropolymers available from Asahi Glass.

The amount of the fluoropolymer used as the process additive is typically relatively low. The exact amount used, may be varied depending upon whether the melt-processable composition is to be extruded into its final form (e.g., as a tube or film) or whether it is to be used as a masterbatch which is to be further diluted with additional host polymer before being extruded into its final form. Generally, the fluoropolymer comprises from about 0.005 to 50 weight percent of the melt processable polymer composition. If the melt processable polymer composition is a masterbatch, the amount of the fluoropolymer may vary between about 2 to 50 weight percent of the composition. If the melt processable polymer composition is to be extruded into final form and is not further diluted by the addition of host polymer, it typically contains a lower concentration of the fluoropolymer, e.g., about 0.005 to 2 weight percent, and preferably about 0.01 and 0.2 weight percent of the melt-processable composition. In any event, the upper concentration of the fluoropolymer used is generally determined by economic limitations rather than by any adverse physical effect of the concentration of the processing aid.

The host polymers useful in the invention are non-aliphatic, non-fluorinated polymers. The non-aliphatic host polymers useful in the invention include, by way of example, non-hydrocarbon polymers, aromatic polymers, non-hydrocarbon/aromatic polymers, etc. Non-hydrocarbon polymers are those that, in addition to carbon and hydrogen, contain other atoms such as a heteroatom (e.g., oxygen, nitrogen, sulfur, phosphorus) in the backbone or in a pendant group. The aromatic host polymers useful in the invention are those that contain at least one aromatic group in the backbone or in a pendant group. Non-hydrocarbon/aromatic polymers useful in the invention are those that contain atoms other than carbon and hydrogen plus aromatic groups in their backbone or in a pendant group. The host polymer may sometimes also be referred to as a polar polymer. By this is meant that the polymer contains polar substituents. The term "non-fluorinated polymer" as used herein means that less than 3% of the C—H bonds of the host polymer can be C—F bonds.

A wide variety of non-aliphatic polymers are useful as the host polymer in the present invention. They include, but are not limited to, polyamides, polyimides, polyurethanes, polyesters, polycarbonates, polyketones, polyureas, polyacrylates, polymethylacrylates, polystyrenes (especially homopolymers of styrene) and polyvinyls (especially homopolymers of a vinyl chloride monomer).

Useful host polymers also include blends of various thermoplastic polymers and blends thereof containing conventional adjuvants such as antioxidants, light stabilizers, fillers, antiblocking agents, and pigments. The host polymers may be used in the form of powders, pellets, granules, or in any other extrudable form.

Polyamides and polyimides represent two classes of polymer that contain a reactive functionality. When these polymers are used as a host polymer, the fluoropolymer most preferably is one that contains less than 15% by weight of interpolymerized units derived from monomers that produce an acidic hydrogen on the fluoropolymer.

The melt processable composition of the invention can be prepared by any of a variety of ways. For example, the host polymer and the fluoropolymer processing additive can be combined together by any of the blending means usually employed in the plastics industry, such as with a compounding mill, a Banbury mixer, or a mixing extruder in which the processing additive is uniformly distributed throughout the host polymer. The processing additive and the host polymer may be used in the form, for example, of a powder, a pellet, or a granular product. The mixing operation is most conveniently carried out at a temperature above the melting point or softening point of the fluoropolymer, though it is also feasible to dry-blend the components in the solid state as particulates and then cause uniform distribution of the components by feeding the dry blend to a twin-screw melt extruder.

The resulting melt-blended mixture can be pelletized or otherwise comminuted into a desired particulate size or size distribution and fed to an extruder, which typically will be a single-screw extruder, that melt-processes the blended mixture. Melt-processing typically is performed at a temperature from 180° to 320° C., although optimum operating temperatures are selected depending upon the melting point, melt viscosity, and thermal stability of the blend. Different types of extruders that may be used to extrude the compositions of this invention are described, for example, by Rauwendaal, C., "Polymer Extrusion," Hansen Publishers, p. 23–48, 1986. The die design of an extruder can vary, depending on the desired extrudate to be fabricated. For example, an annular die can be used to extrude tubing, useful in making fuel line hose, such as that described in U.S. Pat. No. 5,284,184 (Noone et al.), which description is incorporated herein by reference.

The blended composition can contain conventional adjuvants such as antioxidants, antiblocks, pigments, and fillers, e.g. titanium dioxide, carbon black, and silica. Antiblocks, when used, may be coated or uncoated materials. When these adjuvants contain reactive functionalities such as have been discussed above, it is highly preferred that the fluoropolymer contain less than 15% by weight of interpolymerized units derived from a monomer that produces an acidic hydrogen on the backbone of the resulting polymer.

The fluoropolymer processing additive may also be combined with a poly(oxyalkylene) polymer component. The poly(oxyalkylene) polymer component may comprise one or more poly(oxyalkylene) polymers. A useful processing additive composition comprises between about 5 and 95 weight percent of the poly(oxyalkylene) polymer component and 95 and 5 weight percent of the fluoropolymer. Typically, the ratio of the fluoropolymer to the poly(oxyalkylene) polymer component in the processing aid will be from 1/2 to 2/1.

The poly(oxyalkylene) polymer component generally may comprise between about 0.005 and 20 weight percent of the overall melt processable composition, more preferably between about 0.01 and 5 weight percent, and most preferably between about 0.02 and 1 weight percent.

Generally, poly(oxyalkylene) polymers useful in this invention include poly(oxyalkylene) polyols and their derivatives. A class of such poly(oxyalkylene) polymers may be represented by the general formula:

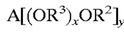

$$A[(OR^3)_xOR^2]_y$$

wherein:

A is an active hydrogen-free residue of a low molecular weight, initiator organic compound having a plurality of active hydrogen atoms (e.g., 2 or 3), such as a polyhydroxyalkane or a polyether polyol, e.g., ethylene glycol, glycerol, 1,1,1-trimethylol propane, and poly(oxypropylene) glycol;

y is 2 or 3;

$(OR^3)_x$ is a poly(oxyalkylene) chain having a plurality of oxyalkylene groups, $(OR^3)$, wherein the $R^3$ moieties can be the same or different and are selected from the group consisting of $C_1$ to $C_5$ alkylene radicals and, preferably, $C_2$ or $C_3$ alkylene radicals, and x is the number of oxyalkylene units in said chain. Said poly(oxyalkylene) chain can be a homopolymer chain, e.g., poly(oxyethylene) or poly(oxypropylene), or can be a chain of randomly distributed (i.e., a heteric mixture) oxyalkylene groups, e.g., a copolymer $—OC_2H_4—$ and $—OC_3H_6—$ units, or can be a chain having alternating blocks or backbone segments of repeating oxyalkylene groups, e.g., a polymer comprising $(OC_2H_4)_a$ and $(OC_3H_6)_b$ blocks, wherein a+b=5 to 5000 or higher, and preferably 10 to 500.

$R^2$ is H or an organic radical, such as alkyl, aryl, or a combination thereof such as aralkyl or alkaryl, and may contain oxygen or nitrogen heteroatoms. For example, $R^2$ can be methyl, butyl, phenyl, benzyl, and acyl groups such as acetyl ($CH_3CO—$), benzoyl ($C_6H_5CO—$) and stearyl ($C_{17}H_{35}CO—$).

Representative poly(oxyalkylene) polymer derivatives can include poly(oxyalkylene) polyol derivatives wherein the terminal hydroxy groups have been partly or fully converted to ether derivatives, e.g., methoxy groups, or ester derivatives, e.g., stearate groups, ($C_{17}H_{35}COO—$). Other useful poly(oxyalkylene) derivatives are polyesters, e.g., prepared from dicarboxylic acids and poly(oxyalkylene) glycols. Preferably, the major proportion of the poly (oxyalkylene) polymer derivative by weight will be the repeating oxyalkylene groups, $(OR^1)$.

The poly(oxyalkylene) polyols and their derivatives can be those which are solid at room temperature and have a molecular weight of at least about 200 and preferably a molecular weight of about 400 to 20,000 or higher. Poly (oxyalkylene) polyols useful in this invention include polyethylene glycols which can be represented by the formula $H(OC_2H_4)_nOH$, where n is about 15 to 3000, such as those sold under the Carbowax trademark, such as Carbowax™ PEG 8000, where n is about 181, and those sold under the trade name Polyox, such as Polyox™ WSR N-10 where n is about 2272.

The following examples further illustrate the present invention. Unless otherwise indicated, in all of the examples, the samples were extruded in a Haake Polylab system and a TW-100 counter-rotating, intermeshing, conical twin-screw extruder (Haake). The extruder was used to prepare concentrates containing 3 weight % fluoropolymer processing additive (PPA). For the viscosity measurements, the PPA was added by dilution of the concentrate to obtain a final concentration of 1000 parts per million (ppm) of the PPA.

Before introduction of each PPA-polymer combination, the extruder and die were thoroughly cleaned. This was achieved by first purging with polyethylene, followed by a 70% $CaCO_3$ polyethylene masterbatch (HM-10, Heritage Plastics), polyethylene again, and finally clean polymer (polystyrene, nylon or polyester). The extruder was cooled to 190° C. before introducing the $CaCO_3$ masterbatch to prevent scorching of the masterbatch.

The viscosity of the resins was measured by using the same extruder which was equipped with a capillary die. The die had a diameter of 1.2 mm and a 40 length/diameter (L/D) ratio. The temperature profile was selected to obtain even extrusion conditions and control the melt temperature. In each case, the extrusion rate and the pressure was recorded for a range of outputs. The viscosity and shear stress were plotted against the shear rate and in the cases where melt fracture occurred, the lowest shear rate where melt was visible (melt fracture onset) was recorded. Tables 1 and 2 list the additives and resins used.

In these Tables, the following abbreviations have the following meaning:

| | |
|---|---|
| E = | ethylene |
| HFP = | hexafluoropropylene |
| P = | propylene |
| TFE = | tetrafluoroethylene |
| VDF = | vinylidene fluoride |
| MFI = | Melt Flow Index measured in accordance with ASTM D-1238 at a support weight of 5 kg and a temperature of 265° C. (2.1 mm diameter extrusion die/8 mm length) |

TABLE 1

| PPA | | | | |
|---|---|---|---|---|
| PPA Sample # | Additive Type | Monomer Weight % | Tm (° C.) | Viscosity |
| PPA-1 | Copolymer VDF/HFP | 60/40 | — | Mooney = 32 |
| PPA-2 | Terpolymer VDF/HFP/TFE | 42/38/20 | 120 | MFI 5/265 = 20 |
| PPA-3 | Copolymer TFE/P | 85/15 | 100 | MFI 5/265 = 14 |
| PPA-4 | Terpolymer HFP/TFE/E | 63/20/17 | 205 | MFI 5/265 = 10 |
| PPA-5 | Copolymer TFE/P | 85/15 | 100 | MFI 5/265 = 12 |
| PPA-6 | Terpolymer HFP/TFE/E | 57/30/13 | 165 | MFI 5/265 = 10 |
| PPA-7 | Terpolymer VDF/HFP/TFE | 60/22/18 | 160 | MFI 5/265 = 60 |
| PPA-8 | Terpolymer VDF/HFP/TFE | 60/22/18 | 160 | MFI 5/265 = 250 |
| PPA-9 | Terpolymer VDF/HFP/TFE | 42/38/20 | 120 | MFI 5/265 = 14 |

TABLE 2

| Host Polymer | | | | |
|---|---|---|---|---|
| Sample # | Polymer Type | Polymer Name | Supplier | Viscosity |
| Resin A | Syndiotactic polystyrene | Questra MA406 | Dow Chemical Company | MFI = 3.5 |
| Resin B | Polyamide 6,6 | Zytel 101 | Dupont | |
| Resin C | Polyamide 6,6 | Celanese 1100 (natural) | Celanese | Fiber Resin |
| Resin D | Polyethylene Terephthalate | Eastapak 9663 | Eastman | Fiber Resin IV = 0.74 |
| Resin E | Polyvinyl Chloride | Fully formulated | Vintex | |

EXAMPLE 1

A sample of Resin A, a syndiotactic polystyrene (Questra MA406 from the Dow Chemical Company), was extruded with a target melt temperature of 300° C.

Table 3 below gives the viscosity as measured for the resin with and without additive. The additive was added at a level of 1000 ppm: In each case, the first shear rate where melt fracture was observed (onset of melt fracture) is indicated. The resin without additive has an onset of approximately 100/s whereas all the additives provide an onset greater than 1000/s.

Table 4 summarizes the performance of the PPA. The addition of PPA to Resin A delays the onset of melt fracture to higher shear rate and provide some pressure reduction.

TABLE 3

| Viscosity of Syndiotactic Polystyrene with PPA | | | | | | | |
|---|---|---|---|---|---|---|---|
| Base Line Resin A | | Resin A + PPA 1 | | Resin A + PPA 2 | | Resin A + PPA 3 | |
| Shear Rate $[s^{-1}]$ | Apparent Viscosity [Pa · s] | Shear Rate $[s^{-1}]$ | Apparent Viscosity (Pa · s) | Shear Rate $[s^{-1}]$ | Apparent Viscosity (Pa · s) | Shear Rate $[s^{-1}]$ | Apparent Viscosity [Pa · s] |
| 25 | 343.4 | 87 | 285.0 | 120 | 320.4 | 1293 | 84.5 |
| 109* | 298.1 | 442 | 163.4 | 393 | 182.5 | 1555 | 75.1 |
| 723 | 130.6 | 799 | 116.8 | 1140 | 94.6 | 1823 | 66.3 |

TABLE 3-continued

| Viscosity of Syndiotactic Polystyrene with PPA | | | | | | | |
|---|---|---|---|---|---|---|---|
| Base Line Resin A | | Resin A + PPA 1 | | Resin A + PPA 2 | | Resin A + PPA 3 | |
| Shear Rate $[s^{-1}]$ | Apparent Viscosity [Pa · s] | Shear Rate $[s^{-1}]$ | Apparent Viscosity (Pa · s) | Shear Rate $[s^{-1}]$ | Apparent Viscosity (Pa · s) | Shear Rate $[s^{-1}]$ | Apparent Viscosity [Pa · s] |
| 873 | 123.7 | 1236* | 87.3 | 1402* | 85.0 | 1855 | 66.5 |
| 1542 | 78.0 | 1757 | 67.2 | 1675 | 72.2 | 2210* | 57.4 |
| 1937 | 64.0 | 1918 | 63.3 | 1994 | 64.2 | 2442 | 53.8 |
| 2297 | 56.4 | 2431 | 52.2 | 2769 | 48.7 | 2958 | 46.3 |
| | | 2982 | 44.6 | 3124 | 45.0 | 3430 | 41.4 |
| | | 3664 | 38.2 | 4169 | 36.5 | 5451 | 29.6 |
| | | 4024 | 34.6 | 4294 | 34.9 | | |

*Onset of melt fracture.

TABLE 4

| Performance of PPA in Polystyrene | | |
|---|---|---|
| Sample | Onset of MF (1/s) | Pressure Reduction at 1300/s* (%) |
| No PPA | 109 | N/A |
| PPA-1 | 1236 | 10 |
| PPA-2 | 1402 | 6 |
| PPA-3 | 2210 | 11 |

*Interpolated values

EXAMPLE 2

A sample of Resin C, a Polyamide 6,6 (Celanese 1100), was extruded with a target melt temperature of 300° C. The additive was added through a concentrate to obtain a final concentration of 1000 ppm. For nylon extrusion a purge compound containing silica (Polybatch KC-15, A. Schulman) was used in place of the $CaCO_3$ masterbatch. Two experiments were repeated in which the extruder was purged with the $CaCO_3$ masterbatch in one case and with the silica masterbatch in the second case.

Table 5 below gives the shear stress vs. shear rate for the base resin and the resin containing a PPA. A repeat sample was tested for the PPA-5. In each case, a lower shear stress is observed with PPA. The shear stress was interpolated at a fixed shear rate of 600/s for comparison purposes. This is given in Table 6 along with the calculated pressure reduction obtained from the PPA. From Table 5, the benefit provided by the PPA is clearly shown. Here a multimodal sample (PPA-5) gives better performance than a unimodal sample (PPA-3).

TABLE 5

| Shear Stress of Polyamide with PPA | | | | | | | | | | | |
|---|---|---|---|---|---|---|---|---|---|---|---|
| Baseline Resin C | | Resin C + PPA-3 | | Resin C + PPA-5 | | Resin C + PPA-6 | | Baseline Resin C (Repeat) | | Resin C + PPA-5 (Repeat) | |
| Shear Rate $[s^{-1}]$ | Shear Stress [kPa] | Shear Rate $[s^{-1}]$ | Shear Stress [kPa] | Shear Rate $[s^{-1}]$ | Shear Stress [kPa] | Shear Rate $[s^{-1}]$ | Shear Stress [kPa] | Shear Rate $[s^{-1}]$ | Shear Stress [kPa] | Shear Rate $[s^{-1}]$ | Shear Stress [kPa] |
| 76 | 9.7 | 109 | 9.6 | 87 | 8.6 | 131 | 6.0 | | | | |
| 240 | 33.4 | 221 | 26.3 | 243 | 28.8 | 292 | 17.4 | 353 | 47.9 | 343 | 31.0 |
| 336 | 42.9 | 347 | 37.4 | 300 | 31.7 | 439 | 25.7 | 542 | 64.3 | 666 | 63.3 |
| 417 | 51.9 | 393 | 45.9 | 390 | 40.3 | 469 | 27.0 | 711 | 83.3 | 899 | 89.2 |
| 551 | 66.9 | 540 | 63.7 | 472 | 51.9 | 562 | 38.4 | 1127 | 119.0 | 960 | 92.8 |
| 682 | 82.9 | 666 | 78.2 | 557 | 63.9 | 696 | 46.7 | 1573 | 155.6 | 1273 | 87.8 |
| 715 | 96.7 | 761 | 89.8 | 734 | 76.0 | 873 | 55.9 | | | 1370 | 126.5 |
| 939 | 110.3 | 865 | 103.0 | 857 | 86.6 | 944 | 64.3 | | | | |
| 955 | 119.7 | 1031 | 117.7 | 936 | 97.3 | 952 | 77.4 | | | | |
| 1094 | 136.1 | 1070 | 125.6 | 1102 | 111.4 | 1020 | 86.1 | | | | |

TABLE 6

Performance of PPA in Polyamide

| | Shear Stress @ 600/s (kPa) | Pressure reduction (%) |
|---|---|---|
| Resin C | 72.8 | |
| Resin C + PPA 3 | 70.6 | 3 |
| Resin C + PPA 5 | 66.8 | 8 |
| Resin C + PPA 6 | 40.7 | 44 |
| Resin C — Repeat | 70.8 | |
| Resin C + PPA 5 Repeat | 56.7 | 20 |

EXAMPLE 3

In order to simulate the high shear and temperatures obtained in compounding, a batch mixer was used. A 5 weight % concentrate of PPA in Resin B was compounded at 300° C. for 10 min, in a Haake Rheocord 90 using a Rheomix™ 3000 bowl fitted with roller blades. In this case, a visual analysis of the color of the samples was done. One can see from Table 7 that the PPA containing VDF can react with polyamide and discolor the sample. This shows the benefit of using non-reactive (non VDF) PPA.

It was unexpected that VDF containing polymer would react with nylon to produce a discolored material.

TABLE 7

Sample Discoloration

| Sample | Color | PPA Concentration in Resin B |
|---|---|---|
| PPA 1 | Dark brown | 5 weight % |
| PPA 4 | Beige | 5 weight % |

EXAMPLE 4

A sample of Resin D, a Polyethylene terephtalate (Eastapak 9663 from Eastman), was extruded with a target melt temperature of 305° C.

Table 8 shows the shear stress vs. shear rate for the resin and the resin with additives. One can clearly see the reduction in stress at higher shear rates. Here lower Mw (higher MFI) provides better performance. This indicates that the PPA is preferably selected to match the resin in which it is used. Table 9 summarizes the pressure reduction obtained for Resin D.

TABLE 8

Shear Stress of PET with PPA

| Resin | | PPA-6 | | PPA-7 | | PPA-8 | |
|---|---|---|---|---|---|---|---|
| Shear Rate ($s^{-1}$) | Shear Stress (kPa) | Shear Rate ($s^{-1}$) | Shear Stress (kPa) | Shear Rate ($s^{-1}$) | Shear Stress (kPa) | Shear Rate ($s^{-1}$) | Shear Stress (kPa) |
| 124 | 9.4 | 546 | 49.9 | 220 | 13.4 | 535 | 36.4 |
| 226 | 14.3 | 831 | 75.9 | 529 | 44.2 | 1001 | 75.2 |
| 480 | 33.7 | 1329 | 119.4 | 1050 | 91.1 | 1142 | 77.7 |
| 1568 | 133.8 | 1364 | 125.7 | 1173 | 93.8 | 1161 | 75.9 |
| 1656 | 157 | 1836 | 130.5 | 1483 | 106.3 | 1470 | 80.6 |
| 1847 | 169.5 | 1967 | 137.1 | 1901 | 127 | 1580 | 81.7 |

TABLE 9

Pressure Reduction in PET

| Sample | Pressure Reduction at 1500/s* (%) |
|---|---|
| PPA-6 | 0 |
| PPA-7 | 16 |
| PPA-8 | 37 |

*Interpolated values

EXAMPLE 5

A sample of Resin E, a polyvinyl chloride, was extruded with a target melt temperature of 160° C. and a shear rate of 580/s. Under those conditions, a pressure reduction of 12% was observed with the addition of 1000 ppm of PPA-9 as compared to the resin without PPA.

In this case, the time required to observe die build-up was also recorded. The resin without PPA led to die build-up in approximately 3 minutes, whereas the resin with PPA-9 was still build-up free after 30 minutes.

What is claimed is:

1. A melt processable polymer composition comprising a major amount of a melt processable thermoplastic non-fluorinated host polymer selected from a polyamide, a polyimide, a polyurethane, polyethylene terephthalate, a polycarbonate, a polyketone, a ployurea, polystyrene, and polyvinyl chloride, and blends thereof and a minor amount of a solid fluoropolymer processing additive; wherein the additive comprises interpolymerized units derived from one or more non-fluorinated monomer(s) having the formula

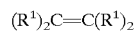

$(R^1)_2C{=}C(R^1)_2$ wherein each $R^1$ may be the same or different and is selected from H, Cl, or an alkyl group of from 1 to 8 carbon atoms, a cyclic alkyl group of from 3 to 10 carbon atoms, or aryl group of from 6 to 8 carbon atoms; and wherein the fluoropolymer contains 15% by weight or less of interpolymerized units derived from a monomer that produces an acidic hydrogen on the backbone or the resulting polymer after polymerization with the proviso that when the host polymer is a polyamide, the fluoropolymer processing additive is a terpolymer.

2. A melt processable composition according to claim 1 wherein the host polymer comprises from about 50 to 99.995 weight % of the composition.

3. A melt processable composition according to claim 1 wherein the fluoropolymer processing additive is amorphous.

4. A melt processable composition according to claim 1 wherein the fluoropolymer processing additive is partially crystalline.

5. A melt processable composition according to claim 4 wherein the fluoropolymer processing additive is multimodal.

6. A melt processable composition according to claim 1 wherein the fluoropolymer comprises interpolymerized units derived from monomers selected from tetrafluoroethylene, hexafluoropropylene, vinylidene fluoride, and perfluoroalkyl vinyl ethers.

7. A processing additive composition according to claim 1 wherein the fluoropolymer comprises interpolymerized units derived from tetrafluoroethylene, hexafluoropropylene, and ethylene.

8. A melt processable polymer composition according to claim 1 wherein the host polymer contains a reactive functionality thereon.

9. A melt processable composition according to claim 1 wherein the monomer that produces acidic hydrogen is selected from the group consisting of vinylidene fluoride, trifluoroethylene, 1-hydrofluoropropene and 2-hydropentafluoropropene.

10. An extrudable composition according to claim 1 wherein the fluoropolymer processing aid further comprises a poly(oxyalkylene) polymer.

11. An extruded article according to claim 10 wherein the article comprises a film, tube, or container.

12. An extruded article comprising the composition of claim 1.

13. A melt processable composition according to claim 1 wherein the interpolymerized units of one or more non-fluorinated monomer(s) are selected from ethylene and/or propylene.

14. A melt processable composition according to claim 1 wherein the fluoropolymer additive comprises interpolymerized units derived from tetrafluoroethylene and/or hexafluoropropylene.

15. A melt processable composition according to claim 14 wherein the fluoropolymer additive comprises interpolymerized units derived from vinylidene fluoride.

16. The melt processable composition of claim 1 wherein the fluoropolymer additive comprises interpolymerized units derived from two fluorinated monomers along with the one non-fluorinated monomer(s).

17. A method for improving the melt processability of a melt processable thermoplastic host polymer selected from a polyamide, a polyimide, a polyurethane, polyethylene terephthalate, a polycarbonate, a polyketone, a polyurea, polystyrene, and polyvinyl chloride, and blends thereof which comprises the steps of:

forming a melt processable polymer composition comprising a major amount of the host polymer and an effective amount but minor amount of a dry fluoropolymer processing additive, wherein the additive comprises interpolymerized units derived from one or more non-fluorinated monomers(s) having the formula $(R^1)_2C{=}C(R^1)_2$ wherein each $R^1$ may be the same or different and is selected from H, Cl, or an alkyl group of from 1 to 8 carbon atoms, a cyclic alkyl group of from 3 to 10 carbon atoms, or aryl group or from 6 to 8 carbon atoms; wherein the fluoropolymer contains 15% by weight or less of interpolymerized units derived form a monomer that produces an acidic hydrogen on the backbone of the resulting polymer after polymerization with the proviso that when the host polymer is a polyamide, the fluoropolymer processing additive is a terpolymer; and wherein the fluoropolymer optionally is multimodal;

melt-mixing or dry blending the processing additive and the host polymer for a time sufficient to blend them together; and melt processing the polymer composition.

18. A method according to claim 17 wherein the melt processable polymer composition comprises from 50 to 99.995 weight percent of the host polymer and from 50 to 0.005 weight percent of the fluoropolymer processing additive.

19. A method according to claim 17 wherein the improvement in melt processability comprises a reduction in melt defects in the melt processed host polymer.

20. A method according to claim 17 wherein the improvement in melt processability comprises a reduction in die build-up during melt processing of the host polymer.

21. A method according to claim 17 wherein the improvement in melt processability comprises a reduction in back pressure during melt processing of the host polymer.

22. A melt processable polymer composition comprising a major amount of a melt processable thermoplastic non-fluorinated host polymer selected from non-hydrocarbon polymers, aromatic polymers, and non-hydrocarbon/aromatic polymers and a minor amount of a multimodal partially crystalline fluoropolymer processing additive.

* * * * *

UNITED STATES PATENT AND TRADEMARK OFFICE

CERTIFICATE OF CORRECTION

PATENT NO. : 6,780,481 B1
DATED : August 24, 2004
INVENTOR(S) : Lavallee, Claude It is certified that error appears in the above-identified patent and that said Letters Patent is hereby corrected as shown below:

Column 4,
Line 34, in the formula, “(II)” should be shown as -- (I) --
Line 45, “or” should be shown as -- of --

Signed and Sealed this

Twenty-first Day of December, 2004

JON W. DUDAS
*Director of the United States Patent and Trademark Office*